United States Patent
Ahn

(10) Patent No.: US 6,297,926 B1
(45) Date of Patent: Oct. 2, 2001

(54) DEVICE AND METHOD FOR COMPENSATING FOR INTERHEAD TRACK POSITION OFFSET DUE TO THE OFFSET OF TRACKS ON DISK SURFACES

(75) Inventor: Young-Sub Ahn, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/589,153

(22) Filed: Jun. 8, 2000

Related U.S. Application Data

(63) Continuation of application No. 08/709,412, filed on Sep. 6, 1996, now Pat. No. 6,094,320.

(30) Foreign Application Priority Data

Sep. 6, 1995 (KR) .................................................. 95/29235
Aug. 13, 1996 (KR) .................................................. 95/33619

(51) Int. Cl.⁷ .................................................. G11B 5/596
(52) U.S. Cl. .......................................................... 360/77.04
(58) Field of Search .................................. 360/77.04, 75, 360/77.05, 77.08, 61

(56) References Cited

U.S. PATENT DOCUMENTS

| | | |
|---|---|---|
| 4,636,884 | 1/1987 | Hattori et al. . |
| 5,185,681 | 2/1993 | Volz et al. ..................... 360/77.04 X |
| 5,321,564 | 6/1994 | Takahasi et al. .................. 360/77.04 |
| 5,424,885 | 6/1995 | McKenzie et al. ........... 360/77.04 X |
| 5,455,724 | 10/1995 | Suzuki et al. ...................... 360/77.04 |
| 5,457,587 | 10/1995 | Suzuki .............................. 360/77.04 |
| 5,500,776 | 3/1996 | Smith . |
| 5,859,742 | * 1/1999 | Takaishi ........................ 360/78.09 X |
| 6,094,320 | 7/2000 | Ahn ................................... 360/77.04 |

FOREIGN PATENT DOCUMENTS

| | | |
|---|---|---|
| 1-91382 | 4/1989 | (JP) . |
| 3-113783 | 5/1991 | (JP) . |
| 4-129071 | 4/1992 | (JP) . |
| 4-283411 | 10/1992 | (JP) . |
| 8-102155 | 4/1996 | (JP) . |

OTHER PUBLICATIONS

Yozo Hibino "Control Method for Magnetic Disk Device,". Patent Abstracts of Japan, P1237. vol. 15, No. 316, p. 119 pf JP 3–113783, MAy 15, 1991 (Aug. 13, 1991).

* cited by examiner

*Primary Examiner*—David Hudspeth
*Assistant Examiner*—James L. Habermehl
(74) *Attorney, Agent, or Firm*—Robert E. Bushnell, Esq.

(57) ABSTRACT

A servo sampling timing generating circuit of a disk drive recording apparatus having a plurality of heads, wherein servo information for measuring interhead track position offset generated in head switching is recorded on a predetermined cylinder on disks in an embedded sector servo mode is characterized in that a final head selection signal and a servo sampling enable signal for sampling the servo information recorded on respective tracks constituting the predetermined cylinder are generated whenever a servo address mark is detected.

17 Claims, 20 Drawing Sheets

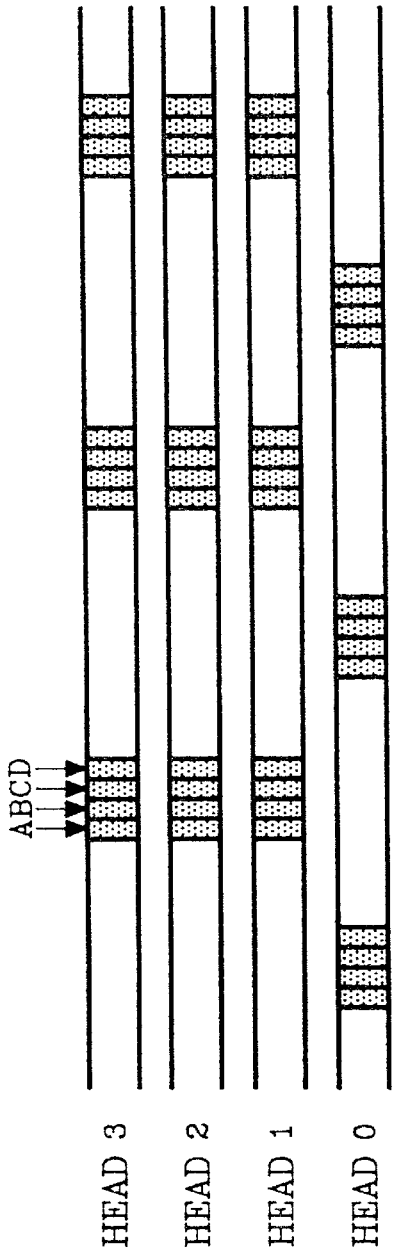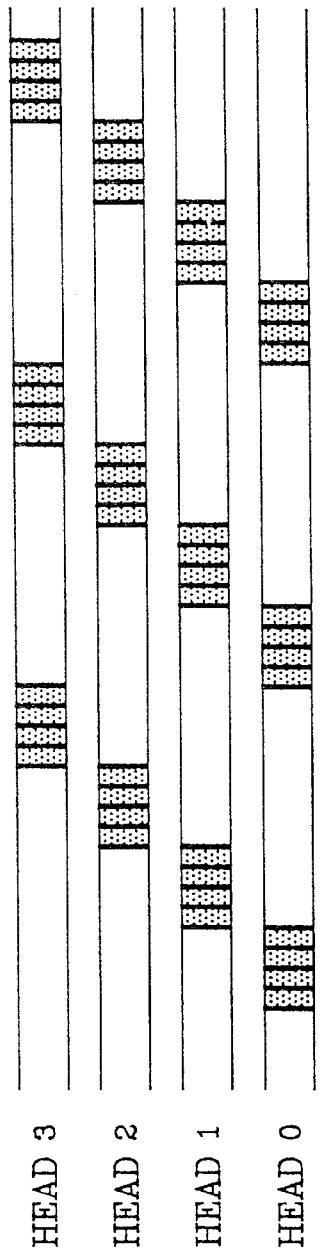
Fig. 5A
Fig. 5B

DEVICE AND METHOD FOR COMPENSATING FOR INTERHEAD TRACK POSITION OFFSET DUE TO THE OFFSET OF TRACKS ON DISK SURFACES

CROSS-REFERENCE TO RELATED APPLICATION

This application is a continuation application of U.S. application Ser. No. 08/709,412, filed in the U.S. Patent & Trademark Office on the 6th day of September 1996, now U.S. Pat. No. 6,094,320, U.S. application Ser. No. 08/709, 412 being incorporated herein by reference. Also, this application makes reference to, incorporates the same herein, and claims priority and all benefits accruing under 35 U.S.C. §120 from the aforementioned U.S. application Ser. No. 08/709,412, filed on the 6day September 1996, entitled Device and Method for Compensating for Interhead Track Position Offset Due to the Offset of Tracks on Disk Surfaces.

CROSS-REFERENCE TO RELATED APPLICATIONS

This application makes reference to, incorporates the same herein, and claims all benefits accruing under 35 U.S.C. §119 arising from an application for Device And Method For Compensating For Interhead Track Position Offset Due To The Offset Of Tracks On Disk Surfaces earlier filed in the Korean Industrial Property Office on Sep. 6, 1995 and there duly assigned Ser. No. 29235/1995.

BACKGROUND OF THE INVENTION

The present invention relates to a disk drive recording apparatus employing an embedded servo sector mode, and more particularly, to a device for a disk drive recording apparatus having at least one disk and a plurality of heads separated from each other on respective surfaces of the disk, for compensating for interhead track position offset caused by the offset of tracks on the disk surfaces in head switching and a method thereof.

A hard disk drive, which is widely used for auxiliary data storage in a computer system, magnetically records data transmitted from a host computer on a disk, and reproduces and outputs the magnetically recorded data. The data transmitted from the host computer is recorded on tracks that are concentrically arranged on the disk. The tracks are divided into data sections where actual data is recorded, and servo sections where servo information is recorded. The servo information includes a variety of information components (i.e., index, sector number, head number, burst signal, etc.), and is used for servo control of a magentic head (i.e., the head's position control and velocity control) while reading and writing data. The servo information is permanently recorded on the disk by a servo writer. Representative servo recording modes include a dedicated servo sector mode and an embedded servo sector mode. The dedicated servo sector mode is performed by selecting the most stable disk surfaces among the several disk surfaces used, so as to record servo information on the entire surface of the disk. The embedded servo sector mode, on the other hand, sets in an identical form a predetermined number of servo sections for the data sections on the overall disk surfaces that are used, and records the servo information.

In conventional disk drive recording apparatuses, one of the main objectives to achieve is to maximize the amount of data that is recorded on the disk; for instance, to increase the tracks per inch (TPI). A condition precedent for this objective is the reliability of servo control. However, mechanical deformations (e.g., thermal expansion, assembly error or external impacts) caused by high track density have a severe influence on the servo control so that the embedded servo sector mode is used more widely than the dedicated servo sector mode. This is because the embedded servo sector mode performs servo control using servo information read from the disk surfaces corresponding to the respective heads. Therefore, thermal offset between heads due to thermal expansion rarely occurs. Nonetheless, various offsets do occur in magnetic disk recording devices, and are a problem.

One prior art reference directed towards correcting offsets in a magnetic disk recording unit is U.S. Pat. No. 5,457,587 entitled Method And System For Correcting Offset Of Head Position Signal issued to Suzuki. In Suzuki '587, the offset of a head position signal is measured and corrected to avoid undesirable effects caused on tracks of a disk. While this reference provides an approach to correcting offsets in a magnetic disk recording unit, I note that it fails to address how to compensate for a track position offset when switching from one head positioned on one surface of a disk to another head positioned on the opposite surface of the disk.

Another prior art reference that discusses the correction of offsets in a magnetic disk recording unit is U.S. Pat. No. 5,185,681 entitled Thermal Offset Compensation For High Density Disk Drives issued to Volz et al. In Volz et al. '681, thermally induced offsets of data heads are compensated for to avoid errors when reading and writing data. While this reference discloses an approach for compensating for offsets in data beads that result from the thermal expansion of actuator arms, I note that it fails to address how to compensate for offsets in tracks that result, for example, from characteristics of a servo writer.

SUMMARY OF THE INVENTION

It is an object of the present invention to provide a device for a disk drive recording apparatus employing the embedded servo sector mode.

It is another object to provide a device for a disk drive recording apparatus for compensating for interhead track position offset caused by the offset of tracks on different disk surfaces in head switching, thereby enhancing servo control performance.

It is still another object to provide a method for a disk drive recording apparatus employing the embedded servo sector mode.

It is yet another object to provide a method for a disk drive recording apparatus for compensating for interhead track position offset caused by the offset of tracks on different disk surfaces in head switching, thereby enhancing servo control performance.

To achieve these and other objects, the present invention provides a device for compensating for interhead track position offset in a disk drive recording apparatus including at least one disk having concentrically arranged tracks with servo information periodically arranged on the tracks and a plurality of heads separated from each other and placed on respective surfaces of the disk. The device contemplates a servo sampling timing generator circuit for measuring interhead track position offset values representative of the interhead track position offset on the respective surfaces of the disk. A microcontroller calculates and stores an average value of the interhead track position offset values. The microcontroller compensates for the interhead track position offset, based on the average value, in head switching from the tracks on a selected surface of the disk to the tracks on an opposite surface of the disk.

The present invention further provides a method for compensating for interhead track position offset in a disk drive recording device having a plurality of heads and disks on which servo information for measuring interhead track position offset generated in head switching is recorded on a predetermined cylinder of the disks in an embedded servo sector mode. The method contemplates the steps of: searching the predetermined cylinder on which the servo information is recorded to locate a servo calibration track; setting one of the plurality of heads as a reference head and measuring track position offset values while switching from the reference head to a second one of the heads; calculating and storing an average value of the track position offset values; and compensating for the track position offset between the reference head and the second head by using the average value, and then performing head switching between the reference head and the second head.

BRIEF DESCRIPTION OF THE DRAWINGS

A more complete appreciation of the present invention, and many of the attendant advantages thereof, will be readily apparent as the same becomes better understood by reference to the following detailed description considered in conjunction with the accompanying drawings, wherein.

DETAILED DESCRIPTION OF THE INVENTION

Preferred embodiments of the present invention will now be described with reference to the attached drawings.

Many specific details, such as logic devices, servo information recorded on servo sections and a specific processing flowchart, which are shown in the following description and attached drawings, are disclosed for the purpose of providing a comprehensive understanding of the present invention. It will be obvious to persons of ordinary skill in the art that the present invention may be implemented without these details. In addition, the details of well-known functions and configurations which may obscure the inventive spirit of the present invention will not be mentioned.

Figure 1:
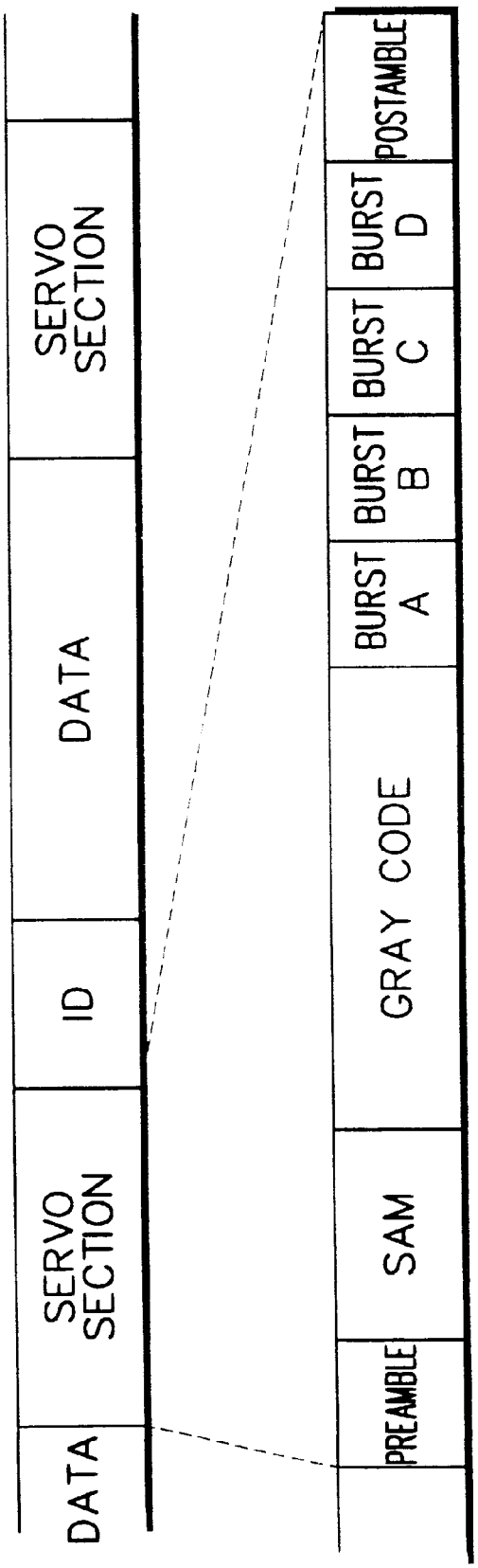
FIG. 1 illustrates a diagram of a general sector format of a predetermined track concentrically arranged on a disk.

Turning now to the drawings and referring to FIG. 1, a diagram of a general sector format of a predetermined track concentrically arranged on a disk surface is shown. The predetermined track is divided into data and servo sections. In FIG. 1, the data section is composed of an ID section where identification information is recorded, and a section where actual data is recorded. The servo section has a preamble section for synchronization with a system clock, a servo address mark (SAM) section where the reference pattern for respective servo timing is recorded, a gray code section where a variety of track information is recorded, and a servo burst (A, B, C and D) section for controlling the head's On-Track operation. Hereinafter, the servo section is assumed to be shown only by the servo burst section in the drawings.

Figure 2A:
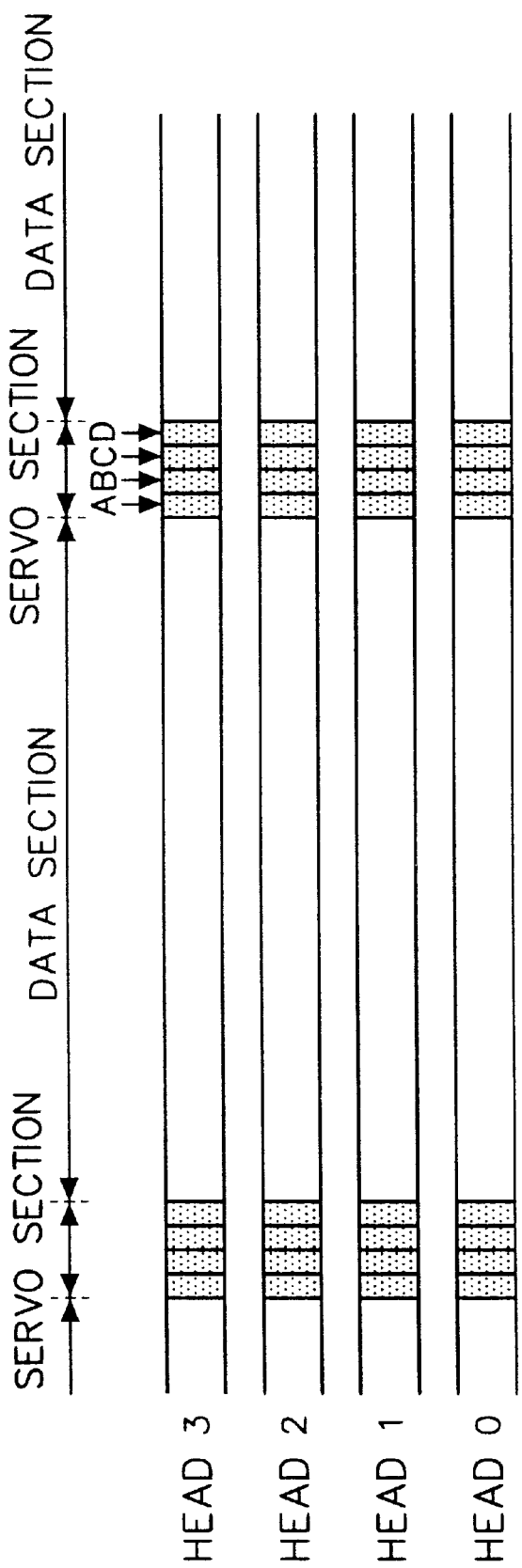
FIGS. 2A and 2B illustrate diagrams of disk sector formats in the case of recording servo information in a bank writing mode and a staggered servo writing mode included in the embedded servo sector mode, respectively.
Figure 2B:
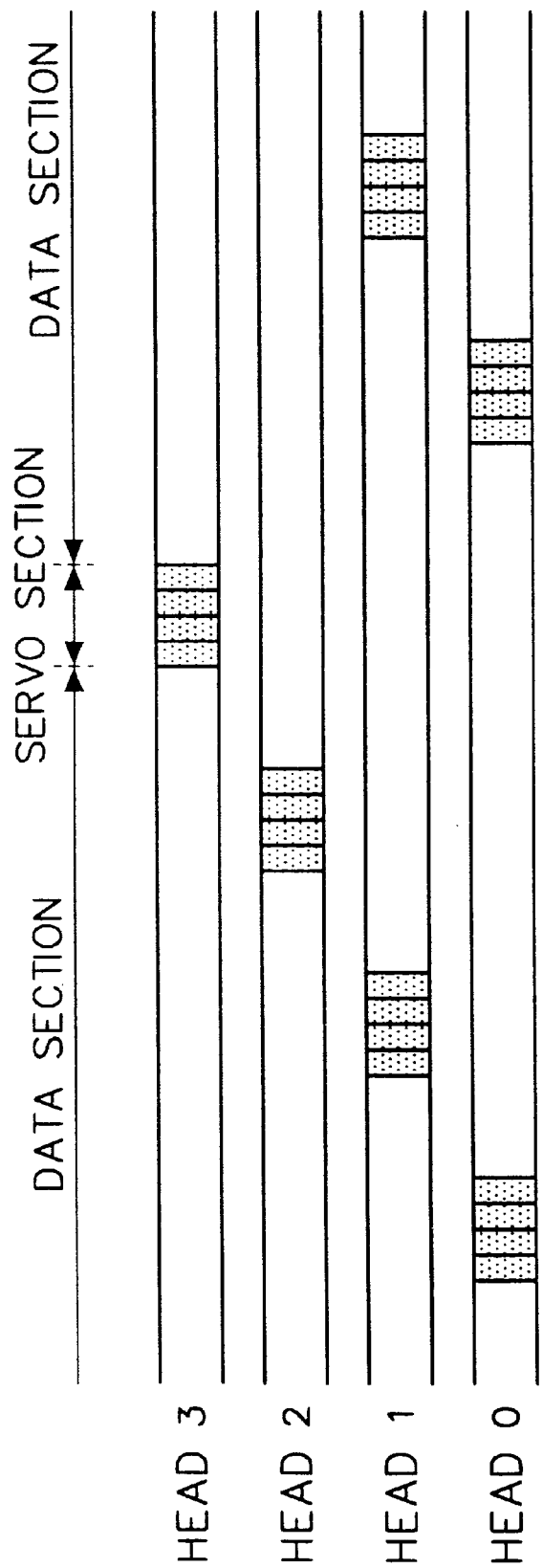

FIG. 2A shows a disk sector format in the case of recording servo information in the bank writing mode of the embedded servo sector mode. FIG. 2B shows a disk sector format in the case of recording servo information in the staggered servo writing mode of the embedded servo sector mode. In both cases, a disk drive recording apparatus having four heads is exemplified. In FIGS. 2A and 2B, the interval of the respective servo sections for all of the heads is constant in both the bank writing mode and the staggered servo writing mode. If servo control involving head switching is performed in the disk drive recording apparatus employing the embedded servo sector mode, there is no reason for a track position offset to occur between stably switched heads. However, the position of the servo recording pattern between heads may be offset, although only slightly, due to the characteristics of the servo writer or external impacts. This effect may appear in a disk drive recording apparatus employing high track density. Therefore, due to the slight track position offset of the servo recording pattern, a predetermined settling time is required until a head selected just after head switching is On-Track controlled. More details thereof will be presented below with reference to FIGS. 3A and 3B.

Figure 3A:
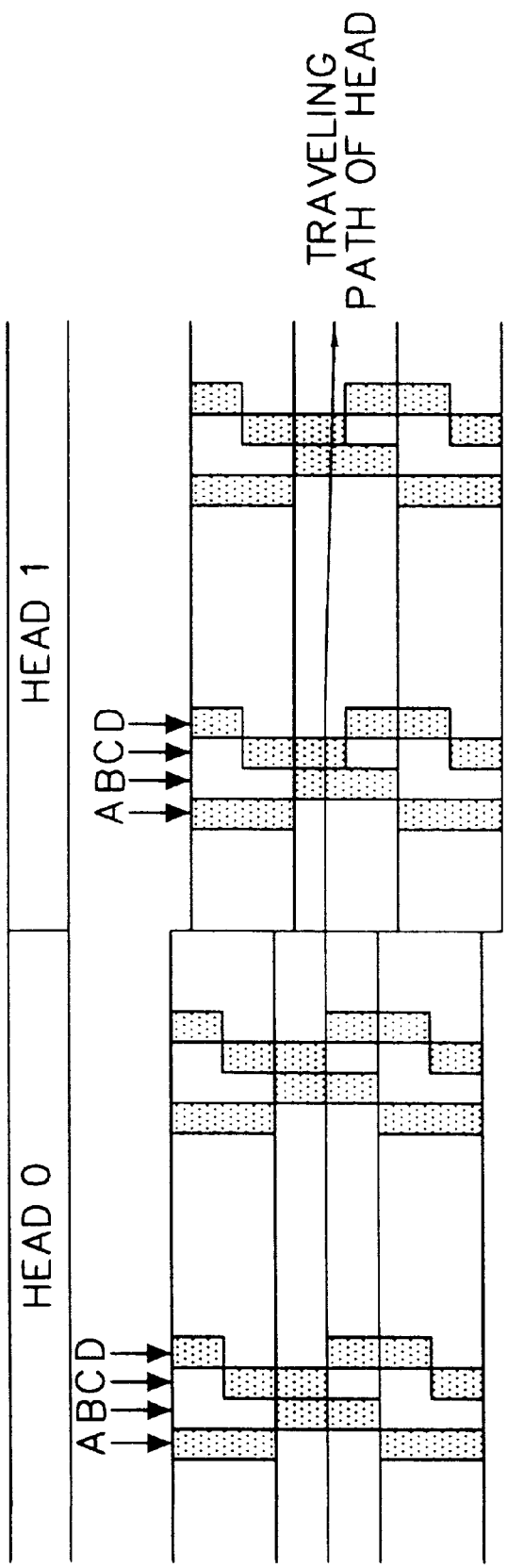
FIG. 3A illustrates a sector format in the case of a predetermined track position offset between heads.
Figure 3B:
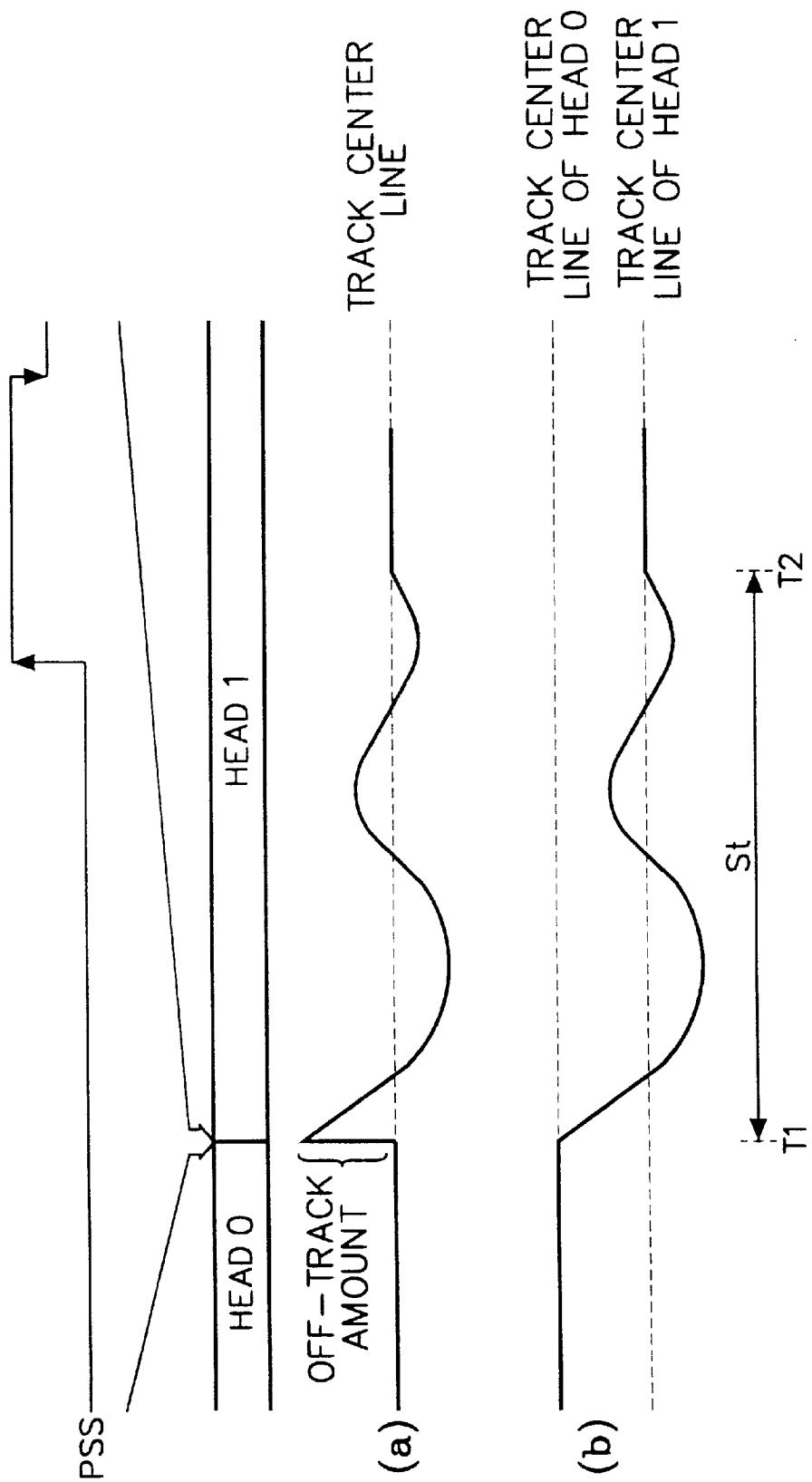
FIG. 3B illustrates the variation characteristics of the Off-Track amount, and the settling time caused by head switching in the case of a predetermined track position offset between heads.

FIG. 3A shows a sector format in the case of a predetermined offset between heads (i.e., head 0 and head 1) caused by the servo writer's characteristic or external impacts. FIG. 3B shows the variation characteristics of the Off-Track amount caused in head switching, and its settling time in the case that the servo recording pattern between the heads (i.e., head 0 and head 1) has a slight track position offset. In FIG. 3B reference character PSS (PES sampling signal) represents the sampling signal of a position error signal (PES) read from the servo information recorded on the disk in head switching (T1: switching from head 0 to head 1). It is shown that the PES value is reduced by stages just after head switching Reference character (a) of FIG. 3B indicates the variation in the amount of Off-Track when head 0 located in the track center line changes to head 1 by head switching. Reference character (b) shows the position variation of the head with respect to the settling time (St) until head 1 is On-Track controlled just after head switching between head 0 and head 1. In the disk drive recording apparatus employing the conventional embedded servo sector mode, the position of the servo recording pattern between heads has a slight offset, as shown in FIG. 3A, due to the servo writer's characteristics or subtle external impacts in recording the servo information, so that the heads' On-Track control is delayed because of the settling time caused by the track position offset of the servo recording pattern in head switching.

Figure 4:
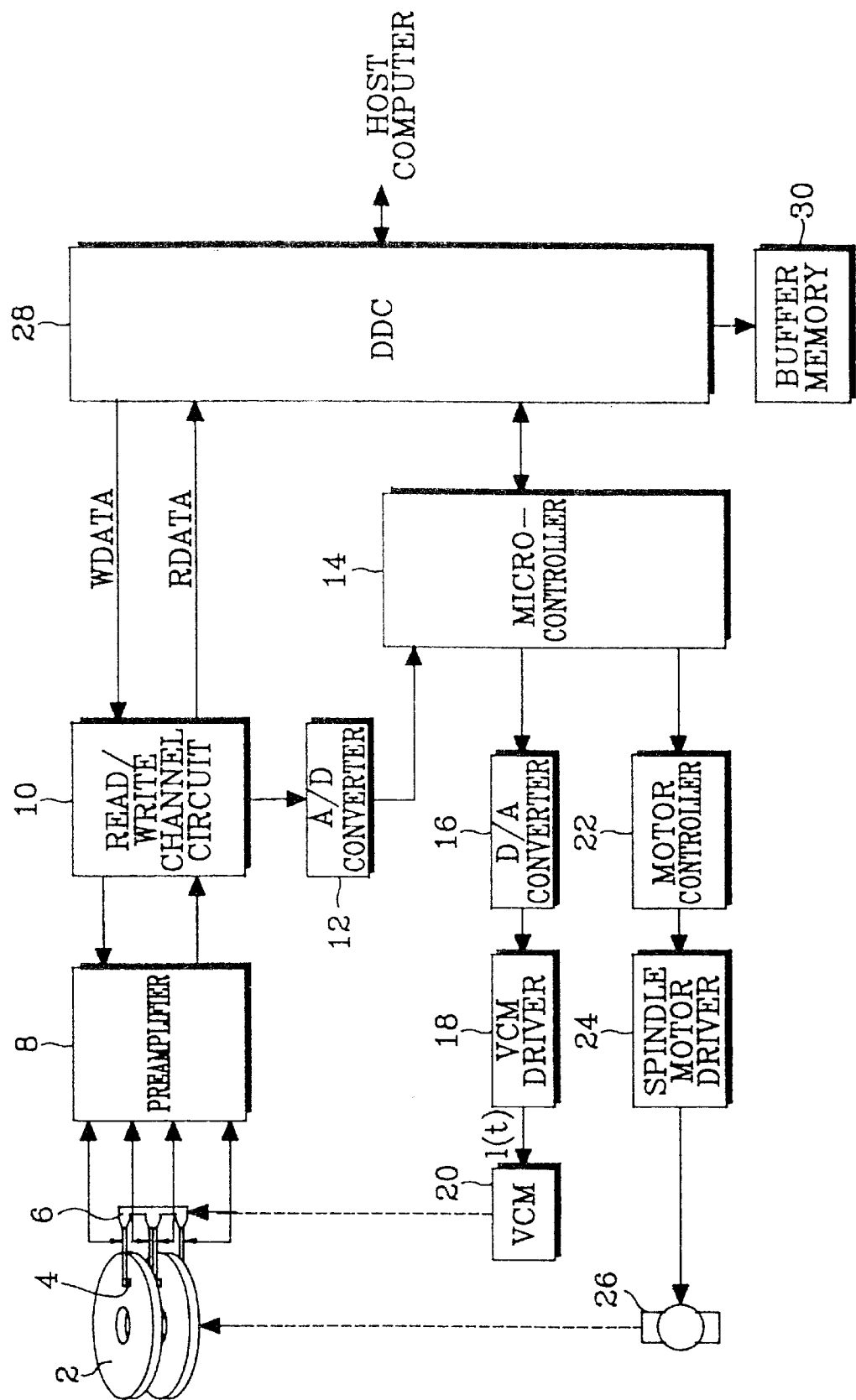
FIG. 4 illustrates a block diagram of a hard disk drive recording apparatus constructed according to the principles of the present invention.

Referring to FIG. 4, a block diagram of a hard disk drive recording apparatus constructed according to the principles of the present invention is shown. In FIG. 4, a hard disk drive having two disks 2 and four heads 4 corresponding thereto are shown as an example. Disks 2 are arranged in a stack, and rotate while mounted on the driving axis of a spindle motor 26. Each of the disk surfaces corresponds to one of the heads 4. Heads 4 are positioned on the surfaces of the disks 2, and are connected to an arm 6 that vertically extends from the arm assembly of a rotary voice coil motor (VCM) 20. A preamplifier 8 amplifies a read signal picked up by one of the heads 4 during a data read mode. The read signal is applied to a read/write channel circuit 10. During a data write mode, encoded write data applied from read/write channel circuit 10 is written onto one of the disks 2 by a corresponding one of the heads 4. Preamplifier 8 selects one of the heads 4 under the control of a disk data controller (DDC) 28. Read/write channel circuit 10 decodes the read signal applied from preamplifier 8 to generate read data RDATA. Read/write channel circuit 10 also encodes write data WDATA applied from disk data controller (DDC) 28, and applies the write data WDATA to preamplifier 8. In addition, read/write channel circuit 10 demodulates head position information, which is part of the servo information written on the disk 2, so as to generate a position error signal (PES). The position error signal (PES) generated from the read/write channel circuit 10 is applied to an analog-to-digital (A/D) converter 12, which converts the position error signal (PES) into a digital value corresponding to its level, and applies the digital value to a microcontroller 14.

Disk data controller (DDC) 28 writes data received from the host computer on the disks 2 via read/write channel circuit 10 and preamplifier 8, and transmits the data read from the disks 2 to the host computer. Disk data controller (DDC) 28 transmits data between the host computer and microcontroller 14. Microcontroller 14 controls the disk data controller (DDC) 28 in response to a data read/write command received from the host computer, and also controls track searching and track tracing. Microcontroller 14 controls track tracing using the position error signal (PES) received from analog-to-digital (A/D) converter 12, and performs servo control corresponding to the respective servo control-related signals output from a gate array (not shown). A digital-to-analog (D/A) converter 16 converts the heads' 4 position control value generated from microcontroller 14 into an analog signal. A voice coil motor (VCM) driver 18 generates electrical current I(t) for driving the actuator in response to the signal provided from digital-to-analog (D/A) converter 16, and applies the electrical current to the voice coil motor (VCM) 20. The voice coil motor (VCM) 20 located on one side of the actuator, moves the heads 4 along the disks 2, corresponding to the current direction and current level provided from voice coil motor (VCM) driver 18. A motor controller 22 controls a spindle motor driver 24 according to a signal value generated from microcontroller 14 for controlling the rotation of the disks 2. Spindle motor driver 24 drives spindle motor 26 under the control of motor controller 22 so as to rotate the disks 2. A buffer memory 30 connected to disk data controller (DDC) 28 temporarily stores data transmitted between the disks 2 and the host computer under the control of disk data controller (DDC) 28.

Figure 5E:
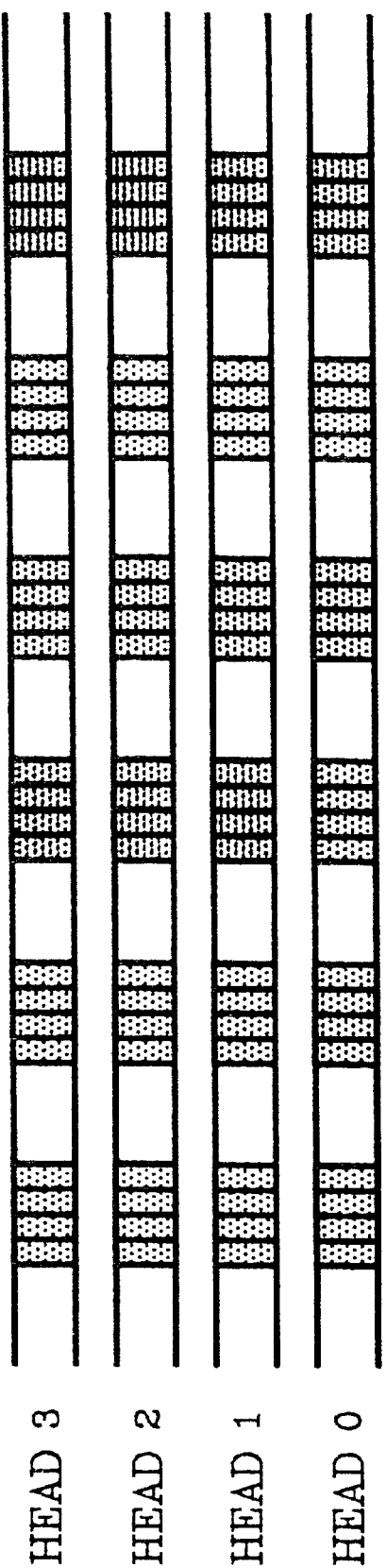
FIGS. 5A, 5B and 5C illustrate servo recording pattern formats of a cylinder for measuring the track position offset between heads according to the principles of the present invention.

Referring to FIGS. 5A, 5B and 5C, servo recording pattern formats of a cylinder for measuring the track position offset between heads according to the principles of the present invention are shown. An example of servo recording patterns recorded on a predetermined cylinder (defined as a cylinder for measuring the track position offset between heads) on the disks 2 so as to measure the track position offset between heads generated in head switching of the disk drive recording apparatus employing the embedded sector servo mode will now be provided with reference to FIGS. 5A, 5B and 5C.

The servo pattern shown in FIG. 5A is a servo recording pattern which can independently servo-write four heads (ie., bead 0, head 1, head 2, and head 3) in the case of directly accessing the output of preamplifier 8 for the servo-write using a POGO pin. FIG. 5B shows a servo recording pattern in the case of recording servo information in the staggered servo-writing mode. FIG. 5C shows a servo recording pattern in accordance with the bank writing mode. In FIGS. 5A, 5B and 5C, the intervals of the servo recording pattern by the respective heads are constant, and the distance of the intervals is designed to be as short as possible.

With the servo recording patterns of FIGS. 5A, 5B and 5C, a procedure for measuring the track position offset between heads will be sequentially described according to a preferred embodiment of the present invention. First, in the case that the servo recording pattern shown in FIG. 5A is recorded on the cylinder for measuring the track position offset between heads, the configuration of the servo sampling timing generator for measuring the track position offset between head 0 and head 1 is as shown in FIG. 6.

Figure 6:
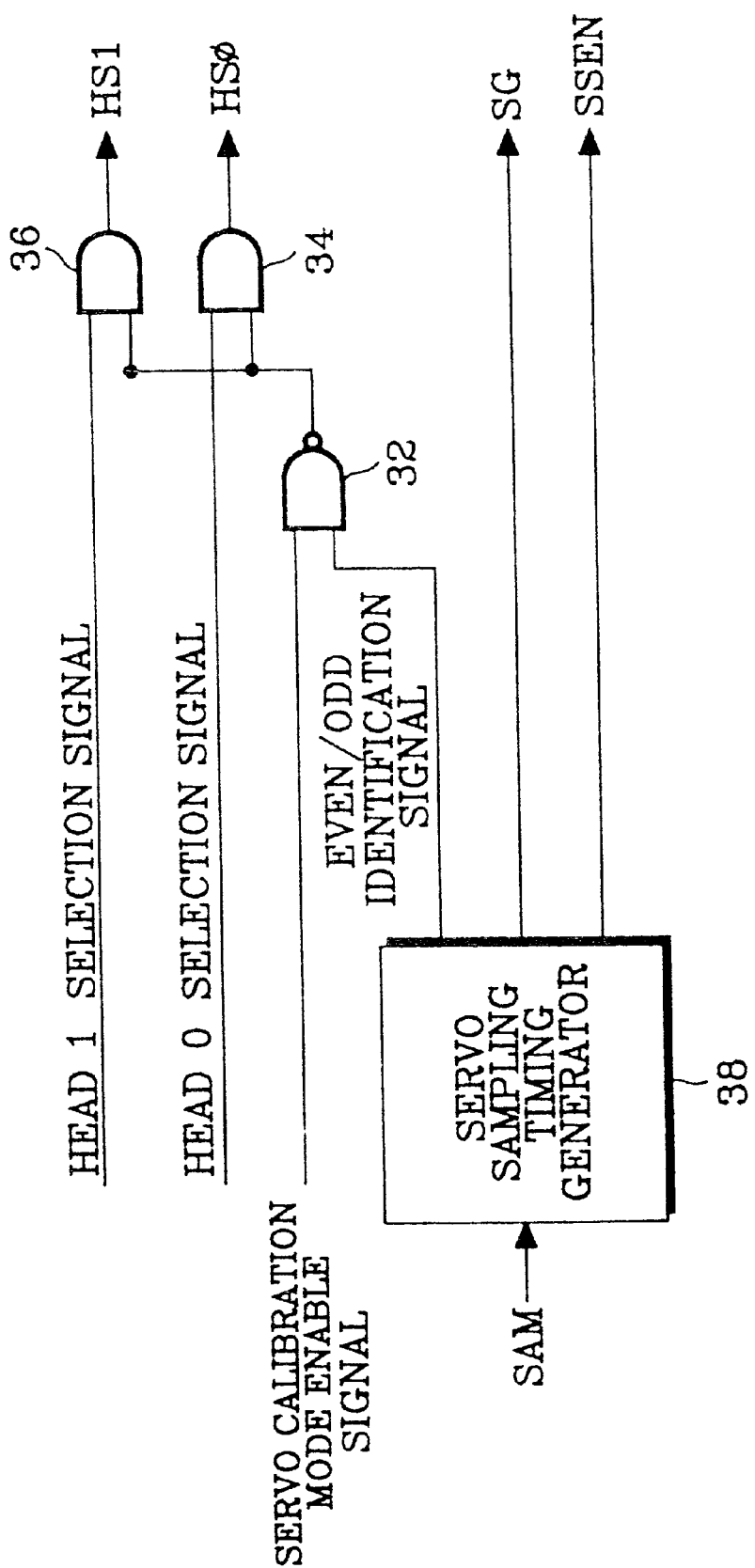
FIG. 6 illustrates a circuit diagram of a servo sampling timing generator constructed according to the principles of the present invention.

In FIG. 6, a servo sampling timing generator 38 generates a servo gate (SG) signal for protecting the servo section, and a servo sampling enable (SSEN) signal in response to a servo address mark (SAM) detection signal input from a servo address mark (SAM) detector. The servo sampling enable (SSEN) signal is output from servo sampling timing generator 38 a predetermined time period after the servo address mark (SAM) detection signal is input to enable sampling of a servo burst signal recorded on the tracks. The servo sampling timing generator 38 also generates an even/odd identification signal whose logic value is inverted when the servo address mark (SAM) detection signal is input. The servo sampling enable (SSEN) signal is used for sampling servo burst signals A, B, C and D, which are used as position identification information of the heads 4. The even/odd identification signal is input to NAND gate 32, and is logically NANDed with a servo calibration mode enable signal that is output under the control of microcontroller 14 and is used as a signal for selecting a final head. The output terminal of NAND gate 32 is connected to input terminals of AND gates 34 and 36, and the signal provided from the output terminal of NAND gate 32 is logically ANDed with head selection signals output under the control of microcontroller 14. In FIG. 6, the signals HSØ and HS1 output from AND gates 34 and 36 are input to preamplifier 8, and are used as signals for selecting one of the heads 4. Although FIG. 6 indicates that only two head selection signals are generated, additional AND gates whose inputs are the head selection signals for the heads can be provided for the number of heads.

Figure 7:
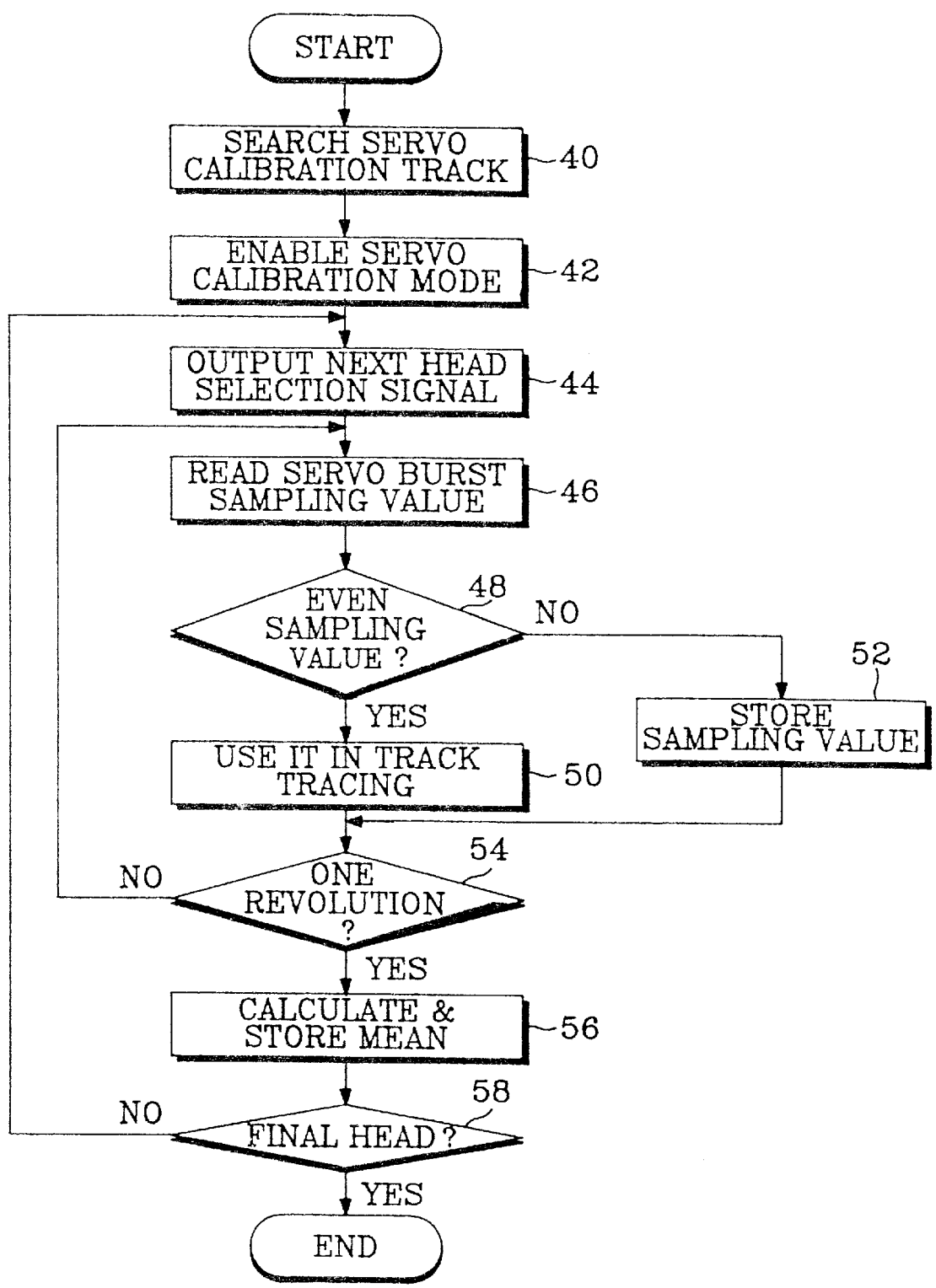
FIG. 7 illustrates a flowchart of a process performed by a microcontroller for measuring the track position offset between heads according to the principles of the present invention.

FIG. 7 shows a control flowchart of microcontroller 14. A procedure for measuring the track position offset between head 0 and head 1 in head switching will now be described with reference to FIGS. 5A, 6 and 7.

Figure 8A:
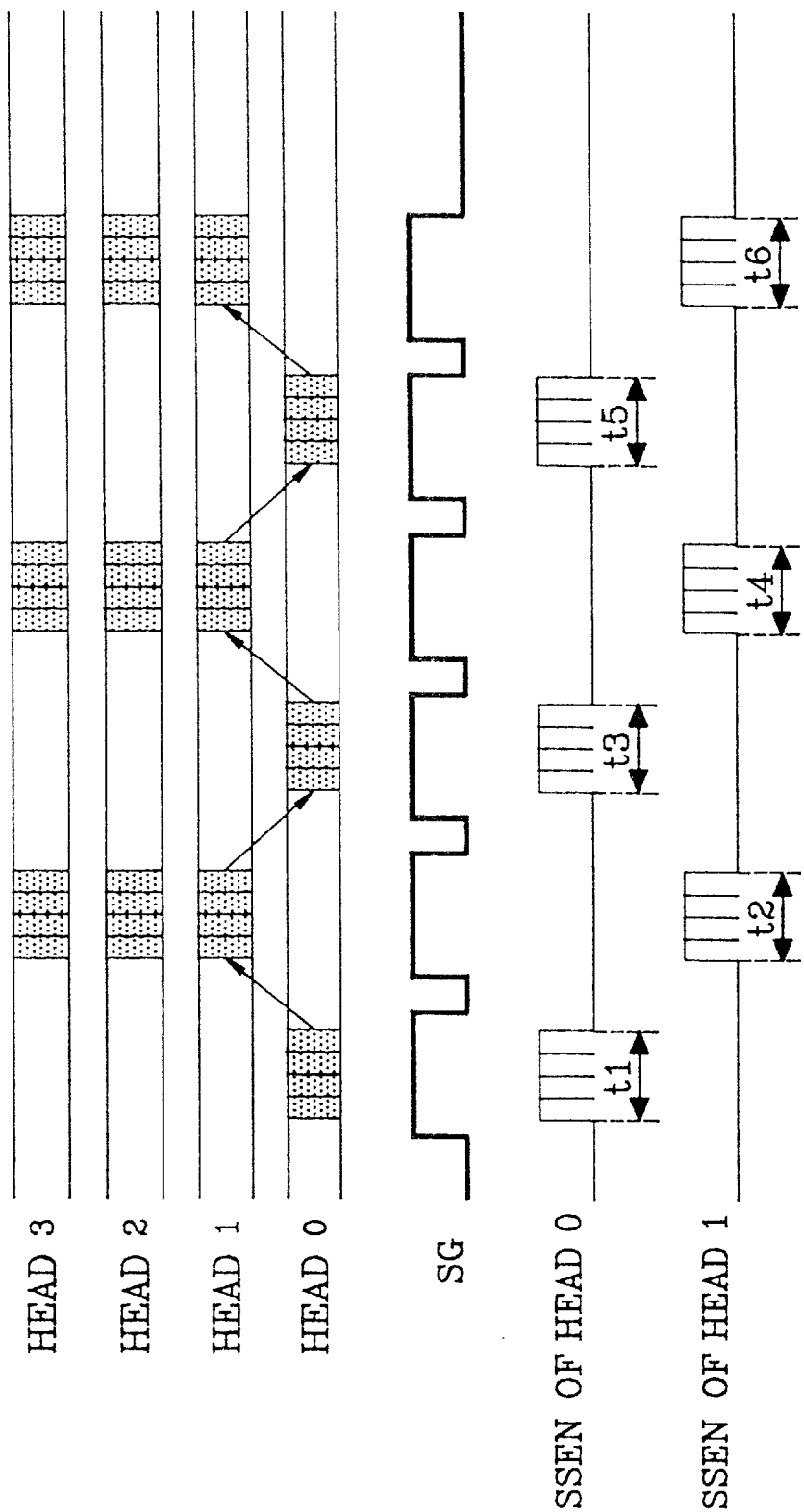
FIGS. 8A, 8B and 8C illustrate diagrams of servo sampling timing among head 0, head 1, head 2 and head 3 in the case of the servo recording pattern shown in FIG. 5A.

The interhead track position offset measuring process of the present invention is performed as part of an initialization carried out after electrical power is applied to the disk drive recording apparatus. When electrical power is applied to the disk drive recording apparatus, microcontroller 14 searches the tracks for a servo calibration track, in step 40, and then proceeds to step 42. The servo calibration track is a reference track for measuring the interhead track position offset of servo information, and corresponds to head 0 of the cylinder for measuring the head offset. Microcontroller 14 outputs a HIGH logic signal for selecting a head corresponding to the servo calibration track during the search for the servo calibration track. In other words, the head 0 selection signal and the head 1 selection signal of FIG. 6 exhibit HIGH and LOW logic states, respectively. Thereafter, microcontroller 14 enables the servo calibration mode in step 42. Here, if microcontroller 14 sets the even/odd identification signal to a HIGH logic state during the initialization of the disk drive recording apparatus, the output signals HSØ and HS1 from AND gates 34 and 36 both will become LOW logic states. If head 0 is selected when the logic values output from AND gates 34 and 36 are both LOW, microcontroller 14 samples the servo burst signal of the track corresponding to head 0 during the interval t1, as shown in FIG. 8A. The servo burst signal is used in track tracing.

In step 44, microcontroller 14 outputs a head selection signal to select the next head. The next head selection signal is a signal for selecting head 1. In this case, the head 0 selection signal and head 1 selection signal are output in LOW and HIGH logic states, respectively. The even/odd identification signal output from servo sampling timing generator 38 is output in a LOW logic state since it is inverted from its initial logic state by the servo address mark (SAM) detection signal provided from the servo address mark (SAM) detector. As a result, the logic states of the signals HSØ and HS1 output from AND gates 34 and 36 become LOW and HIGH, respectively. If head 1 is selected when the signals HSØ and HS1 are LOW and HIGH, respectively, microcontroller 14 samples the servo burst signal recorded on the track corresponding to head 1 to read the servo burst sampling value during the interval t2 of FIG. 8A, in step 46. Then, microcontroller 14 proceeds to step 48 to determine whether the sampling is even or odd numbered. The initial sampling by head 0 during the interval t1 is not considered in this determination. Accordingly, the sampling performed by head 1 during the interval t2 is considered odd numbered. When the sampling is odd numbered, mnicrocontroller 14 advances to step 52 and stores the sampled value in a memory, and then proceeds to step 54. Alternatively, if the sampling is even in step 48, microcontroller 14 advances to step 50 so as to obtain the position error signal (PES) according to the sampled value of the servo burst signal. The position error signal (PES) is used in track tracing, and then step 54 is carried out.

In step 54, microcontroller 14 determines whether the disks 2 haved rotated one revolution. If they have not rotated one revolution, the method returns to step 46, and the servo burst signal recorded on the track corresponding to bead 0 is sampled. This occurs because the logic level of the even/odd identification signal is inverted to the HIGH state when the servo address mark (SAM) detection signal is input while the even/odd identification signal exhibits a LOW logic state. Thus, the logic states of the output signals HSØ and HS1 of AND gates 34 and 36 are both LOW. As a result, head 0 is selected so that the servo burst signal recorded on the track corresponding to head 0 is sampled during the interval t3, as indicated in FIG. 8A Microcontroller 14 uses the servo burst signal sampled during interval t3 in track tracing in step 50 because the sampling performed during t3 is considered as a second (ie., even) sampling. Steps 46–52 are then repeated. As a result, the sampling values of the servo burst signals recorded on the track corresponding to head 1 that are sampled during intervals t2, t4 and t6 shown in FIG. 8A are sequentially stored in memory.

Figure 8B:
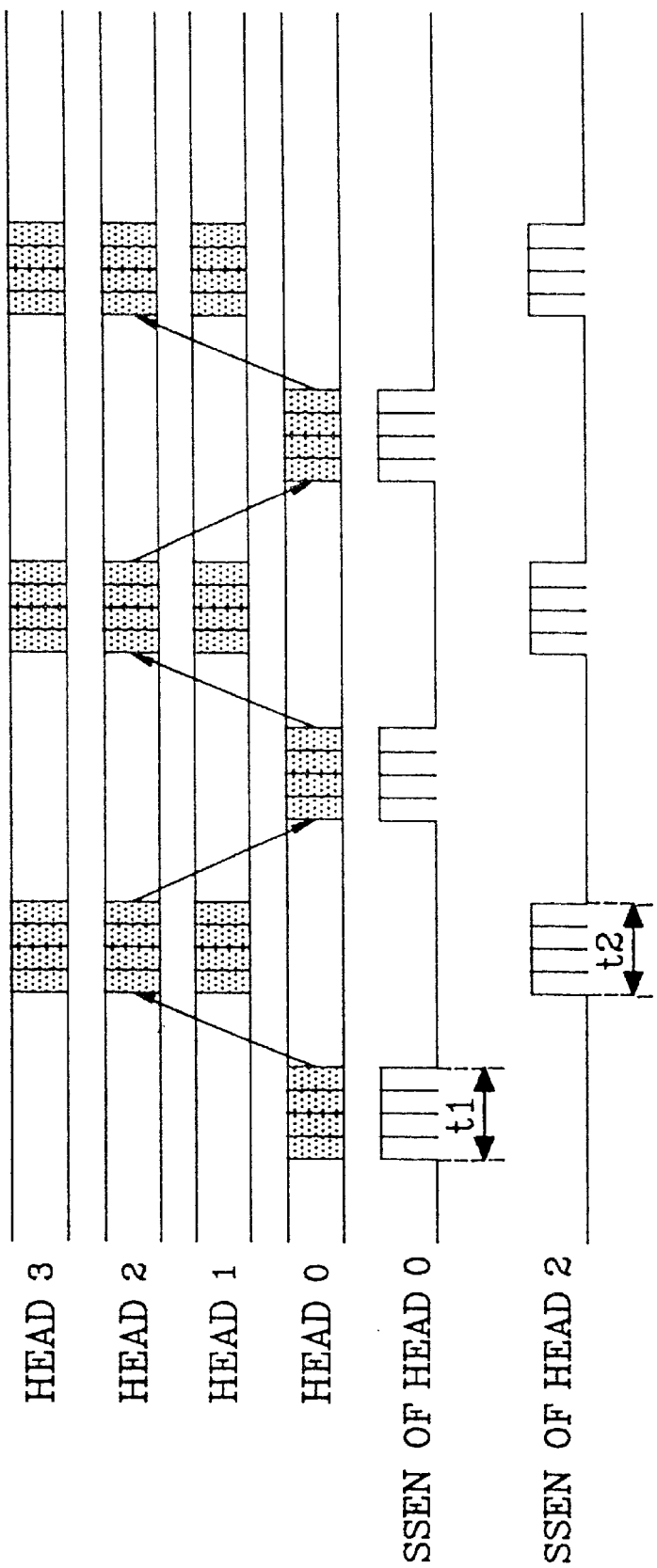
Figure 8C:
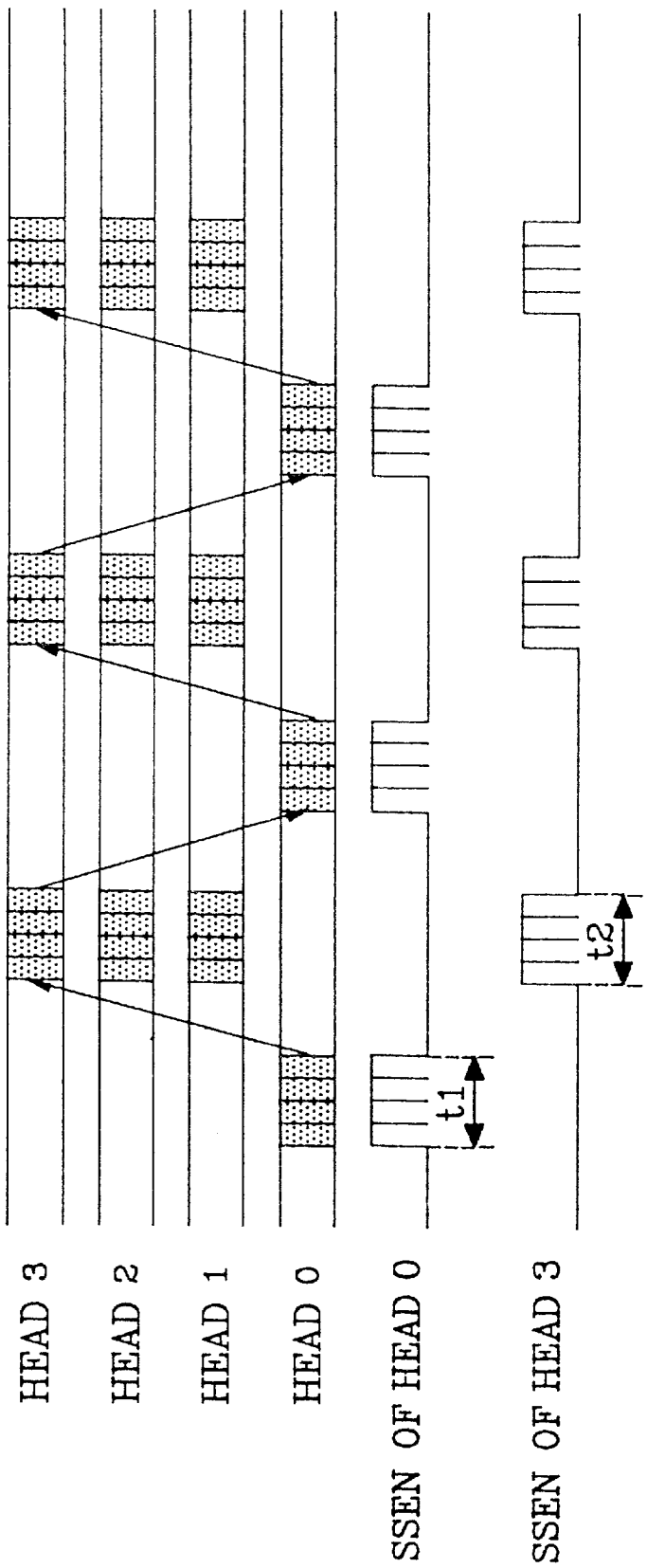

Once the disks 2 have rotated one revolution in step 54, microcontroller 14 proceeds to step 56 to calculate the mean of the sampled values stored in memory, and store the mean value in memory. This mean value represents an average track position offset between head 0 and head 1. Then, in step 58, microcontroller 14 determines whether or not the head initially selected in step 44 is a final head offered within the disk drive recording apparatus. If not, the method proceeds back to step 44. In step 44, microcontroller 14 outputs the head selection signal for selecting head 2 so that head 0 and head 2 are sequentially selected according to the even/odd identification signal whose logic state is changed in correspondence with input of the servo address mark (SAM) detection signal. In other words, microcontroller 14 obtains the track position offset mean present between head 0 and head 2 from the sampled values of the servo burst signals recorded on the tracks corresponding to head 0 and head 2 that are sampled according to the timing intervals shown in FIG. 8B. In the same manner, the track position offset mean present between head 0 and head 3 can be obtained according to the timing intervals of FIG. 8C. Once the currently selected head is the final head in step 58, microcontroller 14 finishes the method of measuring interhead track position offsets in accordance with the preferred embodiment of the present invention, and converts the current mode of the disk drive recording apparatus to a drive ready mode. Thereafter, microcontroller 14 compensates for the interhead track position offsets stored in memory, and then performs head switching so that the delay in settling time attributable to interhead track position offsets can be reduced.

Figure 9A:
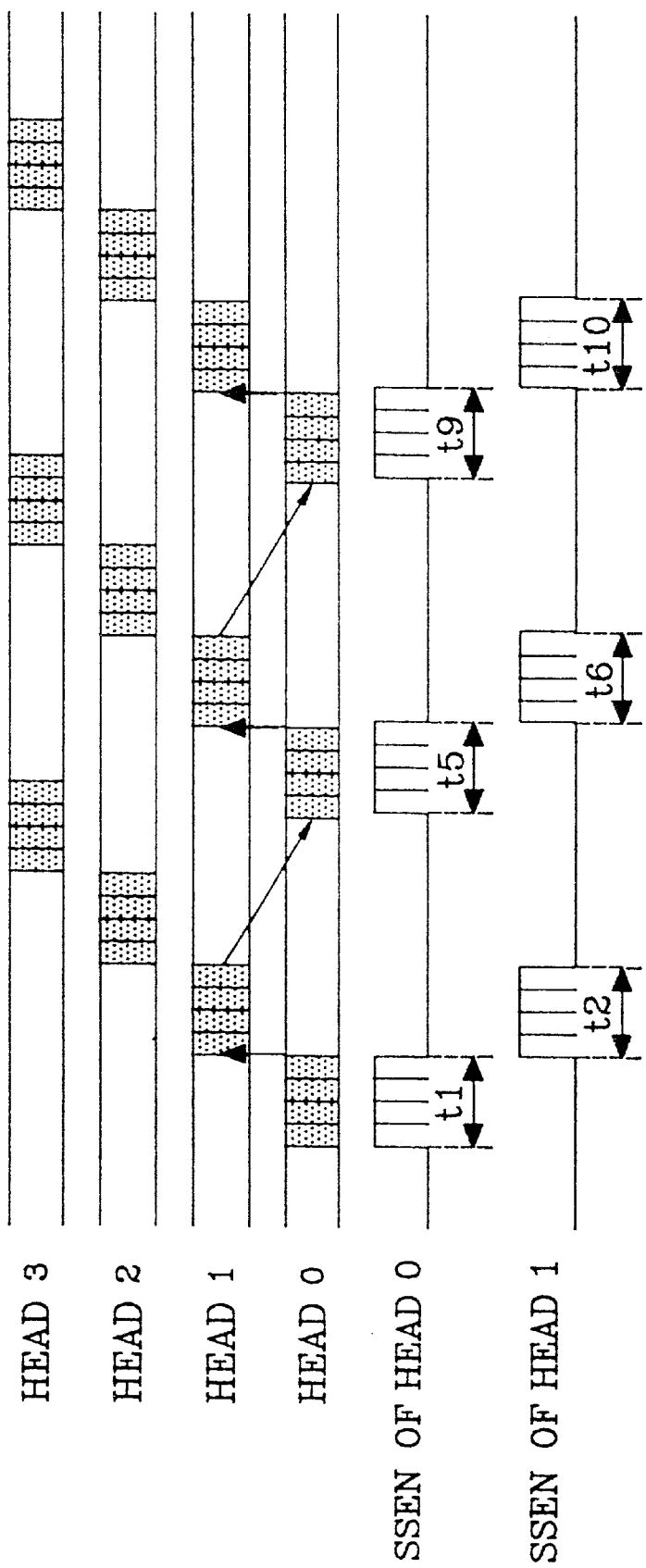
FIGS. 9A, 9B and 9C illustrate diagrams of servo sampling timing among head 0, head 1, head 2 and head 3 in the case of the servo recording pattern shown in FIG. 5B.

Referring to FIG. 9A, an explanation of the process of measuring the track position offset between head 0 and head 1 in the case of the servo recording pattern shown in FIG. 5B will be provided. As indicated in FIG. 9A, microcontroller 14 selects head 0 during intervals t1, t5 and t9, outputs the head selection signal, and samples the servo burst signals recorded on the track corresponding to head 0 for use in track tracing. Microcontroller 14 calculates the position error signal (PES) from the sampled value, and performs servo control so that head 0 is precisely located on the center of the track line. While head 0 is located exactly on the track center line, microcontroller 14 outputs the head selection signal so that head 1 is selected during intervals t2, t6 and t10 in accordance with the even/odd identification signal whose logic level is inverted in response to input of the servo address mark (SAM) detection signal. Microcontroller 14 calculates the track position offset mean from the servo burst signals sampled during the intervals t2, t6 and t10, stores the result, and compensates for the track position offset mean stored in the memory for every head switching operation between head 0 and head 1.

Figure 9B:
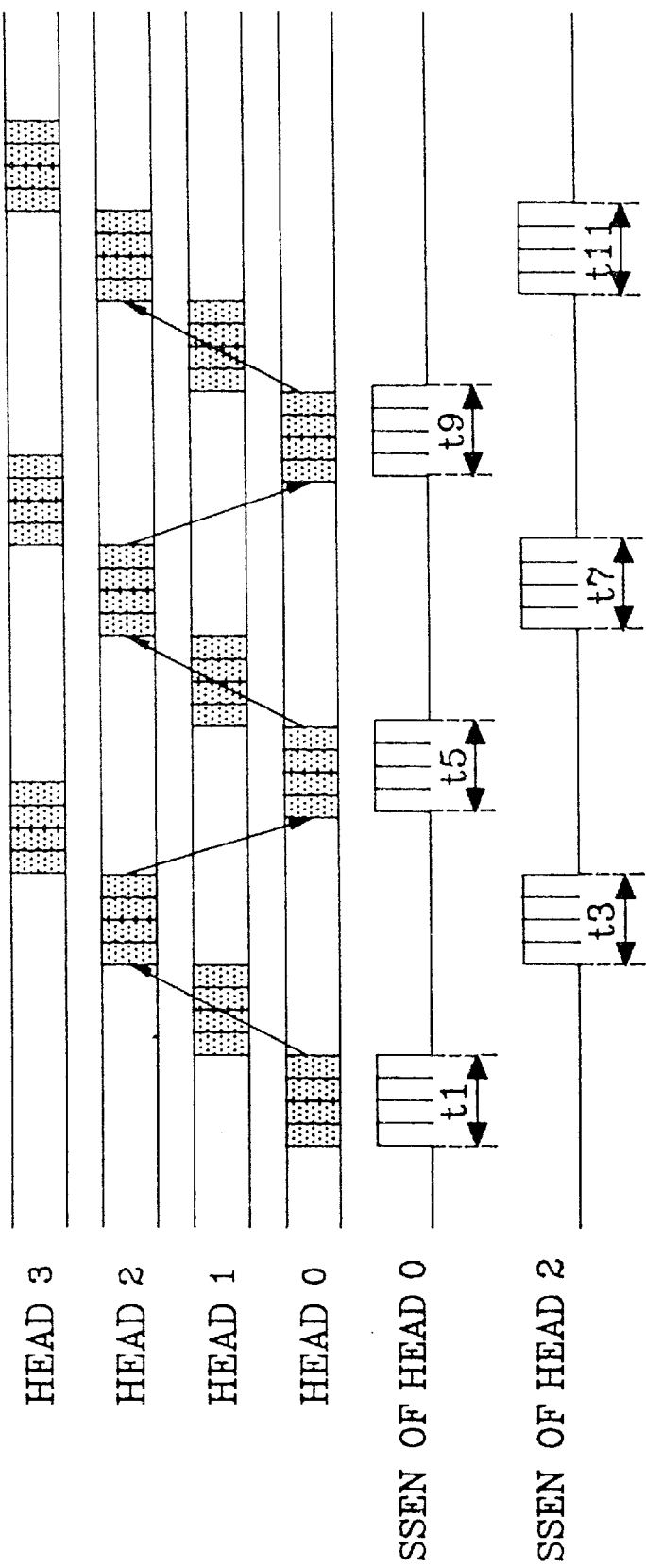
Figure 9C:
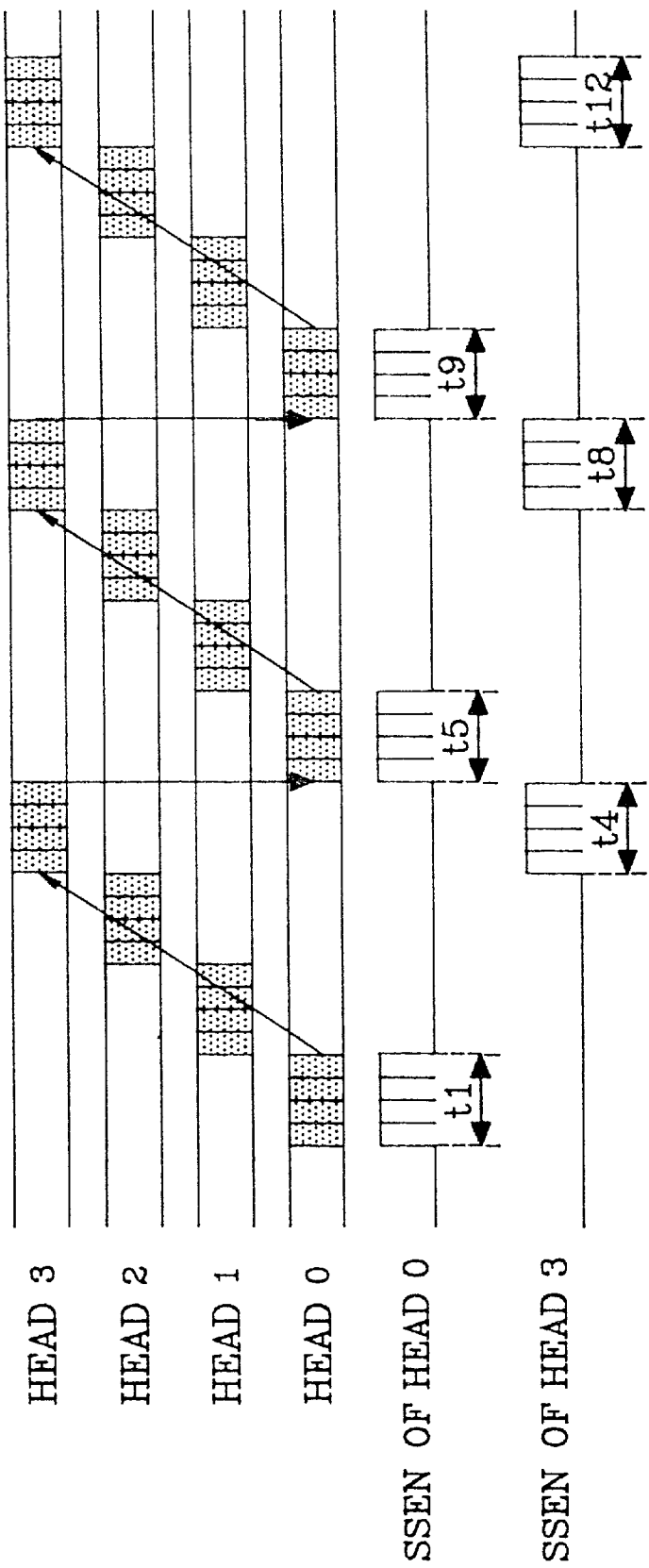

Referring to FIGS. 9B and 9C, the track position offset between head 0 and head 2 and between head 0 and head 3 is measured in the same process as previously described. It should be noted that in the case of the staggered servo recording pattern, as shown in FIGS. 9A, 9B and 9C, the sampling intervals of the servo burst signal for the respective heads are different.

Figure 10A:
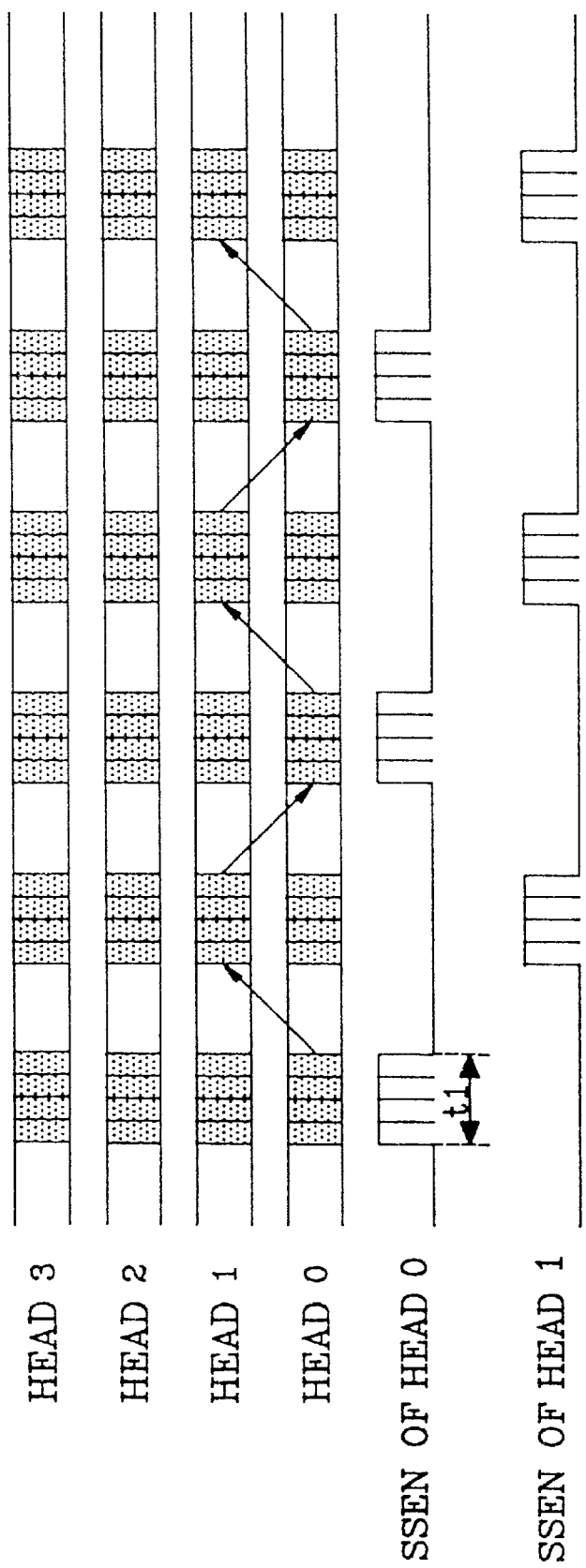
FIGS. 10A, 10B and 10C illustrate diagrams of servo sampling timing among head 0, head 1, head 2 and head 3 in the case of the servo recording pattern shown in FIG. 5C.
Figure 10B:
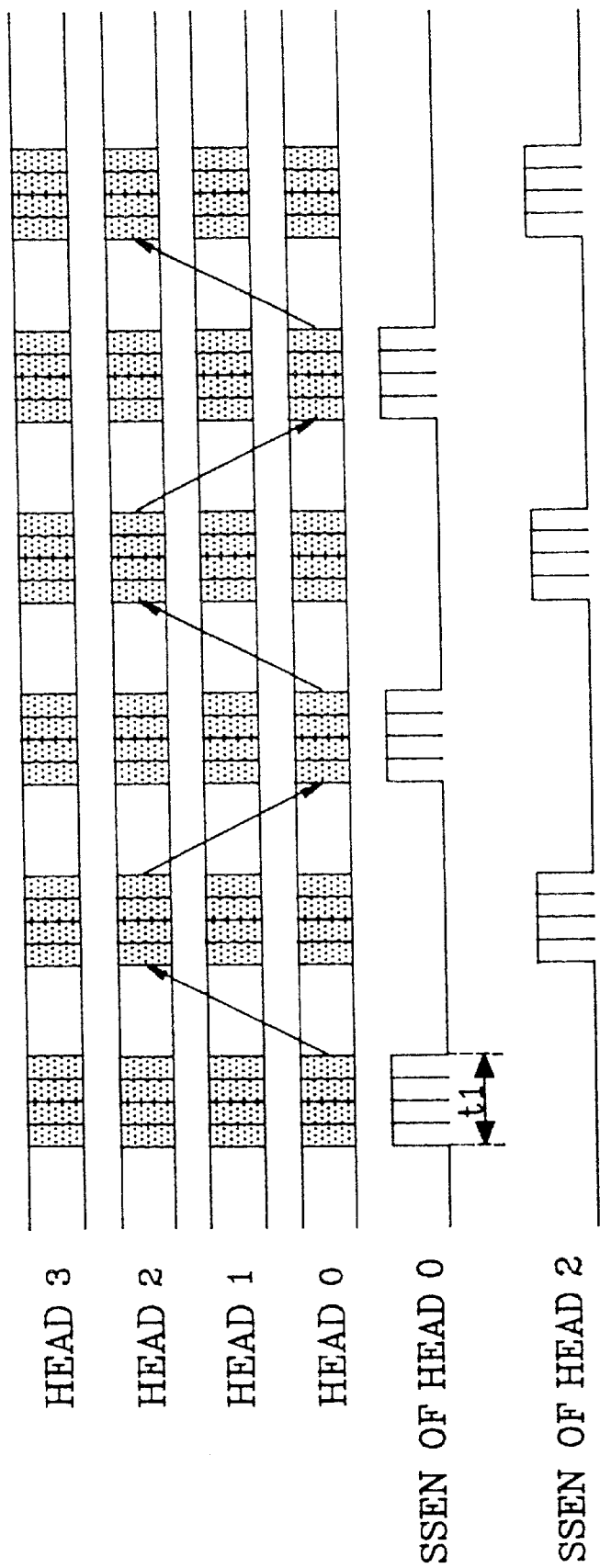
Figure 10C:
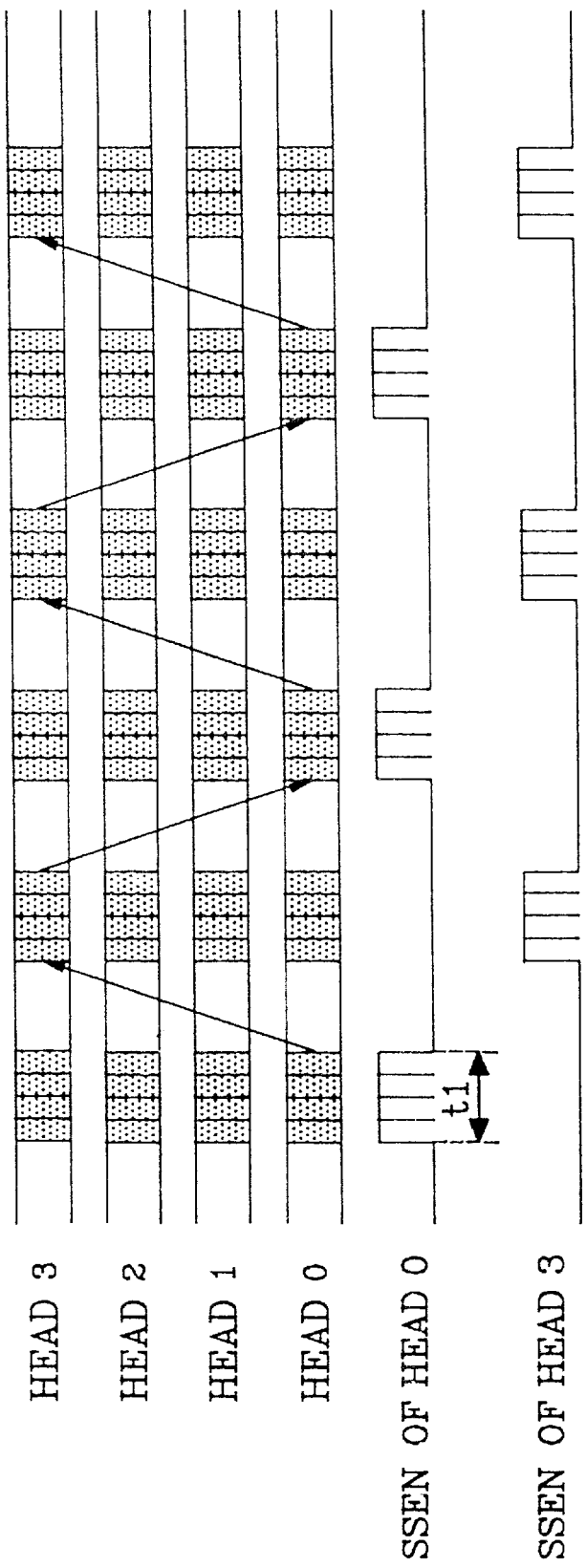

Referring to FIGS. 10A, 10B and 10C, the amount of offset between two heads (i.e., head 0, head 1, head 2, and head 3) is measured in the same manner as described in conjunction with FIG. 8A.

Figure 11:
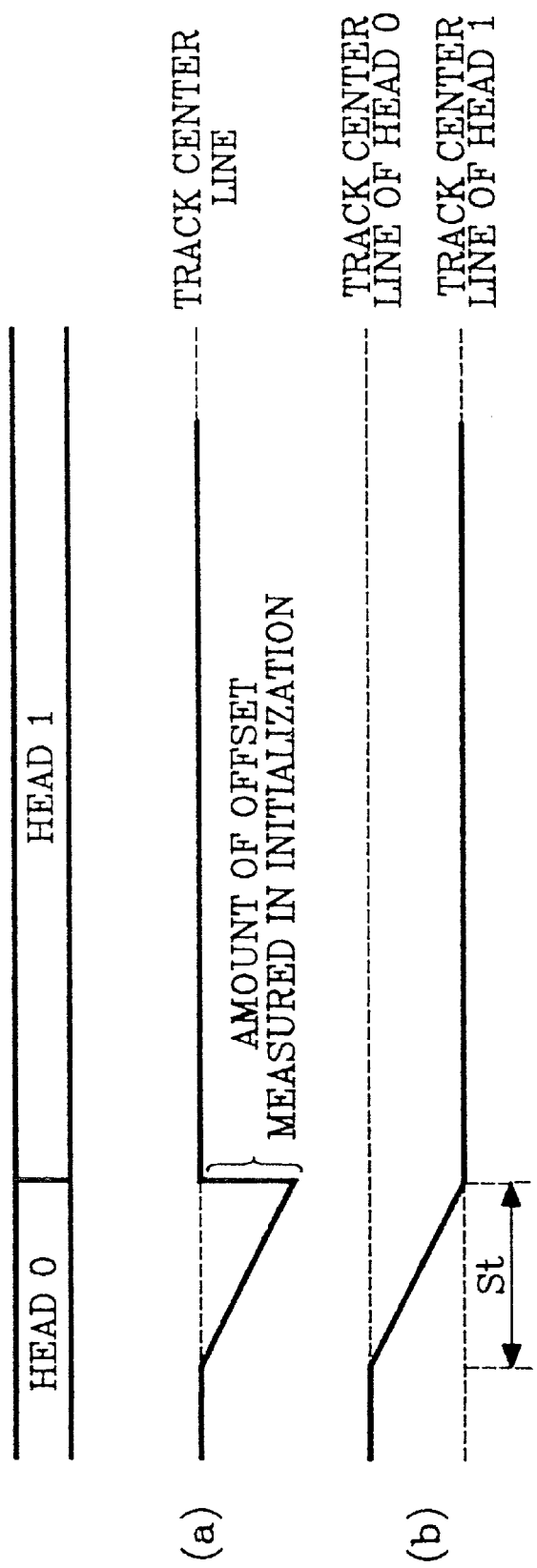
FIG. 11 illustrates On-Track change characteristics of a head according to the principles of the present invention.

Referring to (*a*) of the FIG. 11, the track position offset between head 0 and head 1 measured during the initialization of the disk drive recording apparatus is shown. Referring to (*b*) of FIG. 11, there is shows the variation of settling time St from the track center line corresponding to head 0 to the track center line corresponding to head 1. In the preferred embodiment of the present invention, the track position offset present between two switched heads is measured during the initialization, and then the track position offset is compensated for prior to head switching. Therefore, a stable settling time St, is provided, as shown in (*b*) of FIG. 11. As a result, the On-Track arrival time for the heads 4 is reduced.

As described above, in the present invention, the interhead track position offset is measured with the servo recording pattern recorded on the interhead track position offset measuring cylinder on a predetermined portion of the disk, and the track position offset present between two heads is compensated for prior to head switching. This minimizes the settling time after head switching, and thus enhances the performance of servo control.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A device for compensating for interhead track position offset in a disk drive recording apparatus, comprising:

at least one disk including concentrically arranged tracks with servo information periodically arranged on the tracks;

a plurality of heads separated from each other and positioned in opposing relation to respective surfaces of the at least one disk;

measuring means for measuring interhead track position offset values representative of the interhead track position offset in an embedded servo sector mode caused by offset of tracks on disk surfaces resulting from a servo recording pattern on the respective surfaces of the at least one disk, the measuring means for measuring interhead track position offset values generating a corresponding identification signal whenever a servo address mark is detected and combining the corresponding identification signal and a servo calibration signal to measure a corresponding value of the interhead track position offset;

storing means for determining and storing an average value of the interhead track position offset values; and compensating means for compensating for the interhead track position offset caused by offset of tracks on disk surfaces resulting from said servo recording pattern, based on the average value, in head switching from the tracks on a selected surface of the at least one disk to the tracks on an opposite surface to the selected surface of the at least one disk.

2. The device as claimed in claim 1, further comprised of said measuring means comprising a servo sampling timing generating circuit for generating a final head selection signal and a servo sampling enable signal that are used for sampling the servo information recorded on the tracks and thereby selecting one of the plurality of heads.

3. The device as claimed in claim 1, further comprised on the average value being a mean value of the interhead track position offset values.

4. A method for compensating for interhead track position offset in a disk drive recording device, comprising the steps of:

providing at least one disk including concentrically arranged tracks with servo information periodically arranged on the tracks;

providing a plurality of heads separated from each other and positioned in opposing relation to respective surfaces of the at least one disk;

measuring interhead track position offset values representative of the interhead track position offset in an embedded servo sector mode caused by offset of tracks on disk surfaces resulting from a servo recording pattern on the respective surfaces of the at least one disk, the step of measuring interhead track position offset values comprising generating a corresponding identification signal whenever a servo address mark is detected and combining the corresponding identification signal and a servo calibration signal to measure a corresponding value of the interhead track position offset, and then determining an average value of the interhead track position offset values; and compensating for the interhead track position offset caused by offset of tracks on disk surfaces resulting from said servo recording pattern by using the average value in head switching.

5. The method as claimed in claim 4, further comprised of the average value being a mean value of the interhead track position offset values.

6. A method for compensating for interhead track position offset in a disk drive recording device, comprising the steps of:

searching a predetermined cylinder of at least one disk on which servo information is recorded to locate a servo calibration track;

setting one of a plurality of heads as a reference head and measuring track position offset values while switching from the reference head to a second one of the heads, the measuring track position offset values comprising generating a corresponding identification signal whenever a servo address mark is detected and combining the corresponding identification signal and a servo calibration signal to measure a corresponding value of the track position offset;

determining and storing an average value of the track position offset values; and compensating for the interhead track position offset in an embedded servo sector mode caused by offset of tracks on disk surfaces resulting from a servo recording pattern by using the average value, and then performing head switching between the reference head and the second one of the heads.

7. The method as claimed in claim 6, further comprised of said method being performed every time electrical power is input to said disk drive recording device.

8. The method as claimed in claim 7, further comprised of said track position offset values being generated by sampling servo burst signals contained in the servo information.

9. The method as claimed in claim 8, further comprised of a sampling value generated from a track corresponding to the reference head being used as a position error signal in a track tracing operation.

10. The method as claimed in claim 6, further comprised of the average value being obtained by using sampling values read out by the reference head and the second one of the heads during one revolution of the at least one disk.

11. The method as claimed in claim 6, further comprised of the average value being a mean value of the track position offset values.

12. A method for compensating for track position offset on a disk recording medium in a disk drive recording apparatus, comprising the steps of:

designating a first head as a reference head and measuring track position offset values from the disk recording medium while switching from the reference head to a second head, the reference head being positioned in opposing relation to a first surface of the disk recording medium and the second head being positioned in opposing relation to a second surface of the disk recording medium opposite the first surface of the disk recording medium, the measuring track position offset values comprising generating a corresponding identification signal whenever a servo address mark is detected and combining the corresponding identification signal and a servo calibration signal to measure a corresponding value of the track position offset;

determining and storing an average value of the track position offset values; and compensating for the track position offset in an embedded servo sector mode caused by offset of tracks on disk recording medium surfaces resulting from a servo recording pattern by using the average value, and then performing bead switching between the reference head and the second head.

13. The method as claimed in claim 12, further comprised of said method being performed every time electrical power is input to said disk drive recording apparatus.

14. The method as claimed in claim 12, further comprised of said track position offset values being generated by sampling servo burst signals contained in servo information regions of the disk recording medium.

15. The method as claimed in claim 12, further comprised of the average value being obtained by using sampling values read out by the reference head and the second head during one revolution of the disk recording medium.

16. The method as claimed in claim 12, further comprised of the track position offset being attributable to a characteristic of a servo writer that writes servo information upon the disk recording medium.

17. The device as claimed in claim 12, further comprised of the average value being a mean value of the interhead track position offset values.

* * * * *